United States Patent [19]

Getson, Jr. et al.

[11] Patent Number: 5,101,490

[45] Date of Patent: Mar. 31, 1992

[54] PERIPHERAL DEVICE CONTROLLER WITH AN EEPROM WITH MICROINSTRUCTIONS FOR A RAM CONTROL STORE

[75] Inventors: Edward F. Getson, Jr.; John W. Bradley, both of Peabody, Mass.; Joseph P. Gardner, Merrimack, N.H.; Alfred F. Votolato, Johnston, R.I.

[73] Assignee: Bull HN Information Systems Inc., Billerica, Mass.

[21] Appl. No.: 295,318

[22] Filed: Jan. 10, 1989

[51] Int. Cl.$^5$ .............................................. G06F 9/22
[52] U.S. Cl. .............................. 395/425; 364/DIG. 1; 364/243; 364/248.1; 364/262.8; 364/260
[58] Field of Search ... 364/200 MS File, 900 MS File

[56] References Cited

U.S. PATENT DOCUMENTS

| | | | |
|---|---|---|---|
| 4,403,303 | 9/1983 | Howes et al. | 364/900 |
| 4,663,707 | 5/1987 | Dawson | 364/200 |
| 4,679,166 | 7/1987 | Berger et al. | 364/900 |
| 4,716,523 | 12/1987 | Burrus, Jr. et al. | 364/200 |
| 4,757,533 | 7/1988 | Allen et al. | 380/25 |
| 4,769,767 | 9/1988 | Hilbrink | 364/200 |
| 4,803,623 | 2/1989 | Klashka et al. | 364/200 |
| 4,831,523 | 5/1989 | Lewis et al. | 364/200 |
| 4,853,850 | 8/1989 | Krass, Jr. et al. | 364/200 |
| 4,891,743 | 1/1990 | Moy et al. | 364/483 |
| 4,907,228 | 3/1990 | Bruckert et al. | 364/900 |
| 4,931,922 | 6/1990 | Baty et al. | 364/200 |
| 4,935,863 | 6/1990 | Calvas et al. | 364/138 |
| 4,935,956 | 6/1990 | Hellworth et al. | 379/112 |

FOREIGN PATENT DOCUMENTS 0266789 6/1987 European Pat. Off. .

*Primary Examiner*—Thomas C. Lee
*Assistant Examiner*—Mehmet Geckil
*Attorney, Agent, or Firm*—James M. Smith; Faith F. Driscoll; John S. Solakian

[57] ABSTRACT

A peripheral device controller has an EEPROM which stores microinstructions to be placed in a random access memory control store. The EEPROM also stores peripheral configuration information. This information is obtained by polling the peripheral devices connected to the controller and storing the resulting information in the EEPROM. Upon powering up, the microinstructions stored in the EEPROM are transferred to the control store via execution of instructions held in a boot PROM. The controller, therefore, provides a fast control store while maintaining permanence of the microinstructions after power is extinguished. Means are also provided to update the control store and EEPROM. The EEPROM may upon CPU command be updated with new microinstructions held in main memory or obtained from peripheral devices.

11 Claims, 3 Drawing Sheets

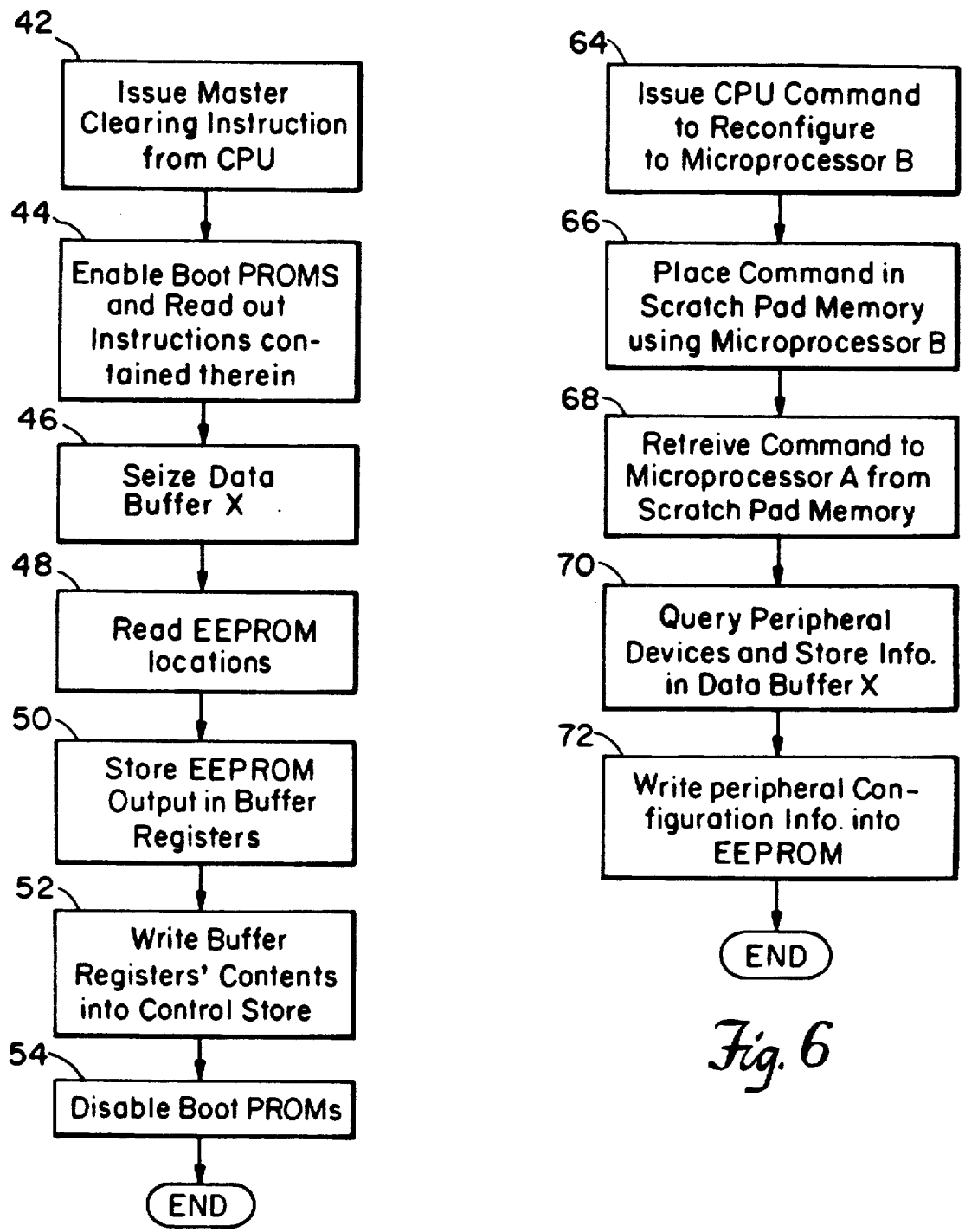

PERIPHERAL DEVICE CONTROLLER WITH AN EEPROM WITH MICROINSTRUCTIONS FOR A RAM CONTROL STORE

RELATED PENDING APPLICATIONS

The following patent applications, which are assigned to the same assignee as the instant application, have been filed on the same date as the instant application, and they contain related subject matter.

| Title | Inventors | Ser. No. |
|---|---|---|
| Multiprocessor Controller Having Shared Control Store | Edward F. Getson, Jr. John W. Bradley Joseph P. Gardner & Alfred F. Votolato | 07/295,629 |
| Peripheral Controller With Paged Data Buffer Management | Edward F. Getson, Jr. John W. Bradley Joseph P. Gardner & Alfred F. Votolato | 07/295,335 |
| Method And Apparatus For Limiting the Utilization of an Asynchronous Bus With Distributed Controlled Access | George J. Barlow John W. Bradley & Edward F. Getson, Jr. | U.S. Pat. No. 4,888,727, issued on 12/19/89. |

BACKGROUND OF THE INVENTION

1. Field of Use

This invention relates generally to data processing systems. More specifically, it relates to controllers for controlling data transfers between a data processing system and peripheral devices.

2. Prior Art

Most modern data processing systems rely on a controller for controlling data transfers between the central processing unit (CPU) on a system bus and the peripheral devices. With the advent of more and more types of peripheral devices having vastly different operating characteristics, there has been an increased demand for controllers capable of controlling data transfers for the entire range of devices having differing operating characteristics. Moreover, there has also been a greater demand for controllers to simultaneously service a larger number of devices. In order to fulfill these increased demands, manufacturers have begun to use microprocessors in controllers.

The addition of microprocessors to controllers has also mandated the addition of a control store for storing the microinstructions that the microprocessors execute.

SUMMARY OF THE INVENTION

In one aspect of the present invention a peripheral device controller for controlling data transfers between a data processing system bus and peripherals comprises at least one microprocessor for executing microinstructions which control data transfers to and from the controller. The controller also includes a control store comprising a random access memory for storing the microinstructions used by the processor. These microinstructions are also held in an electrically erasable and programmable read only memory (EEPROM). Microinstructions are retained in the EEPROM even after the loss of power, and are transferred into the control store with return of power. The contents of the EEPROM may be updated by instructing the processor to reload the EEPROM. Thus, the controller can be adapted to different peripheral configurations, and the processor can be directed to perform new functions. In a preferred embodiment, a boot PROM is provided to assist in transfer of the microinstruction from the EEPROM to the control store.

In the preferred embodiment, one of the microprocessors is used to poll peripherals to obtain peripheral configuration information. This configuration information is stored in a table in the EEPROM. When the data processing system is powered up, a CPU for the system polls the controller. In response to the polling, the controller passes to the CPU the peripheral configuration information table from the EEPROM.

BRIEF DESCRIPTION OF THE DRAWINGS

The foregoing and other objects, features and advantages of the invention will be apparent from the following more particular description of a preferred embodiment of the invention, as illustrated in the accompanying drawings.

FIG. 3 shows a flow chart depicting the process of transferring microinstructions from the EEPROM to the control store.

FIG. 6 shows a flow chart depicting the reconfiguration process.

DETAILED DESCRIPTION OF THE PREFERRED EMBODIMENT

Figure 1:
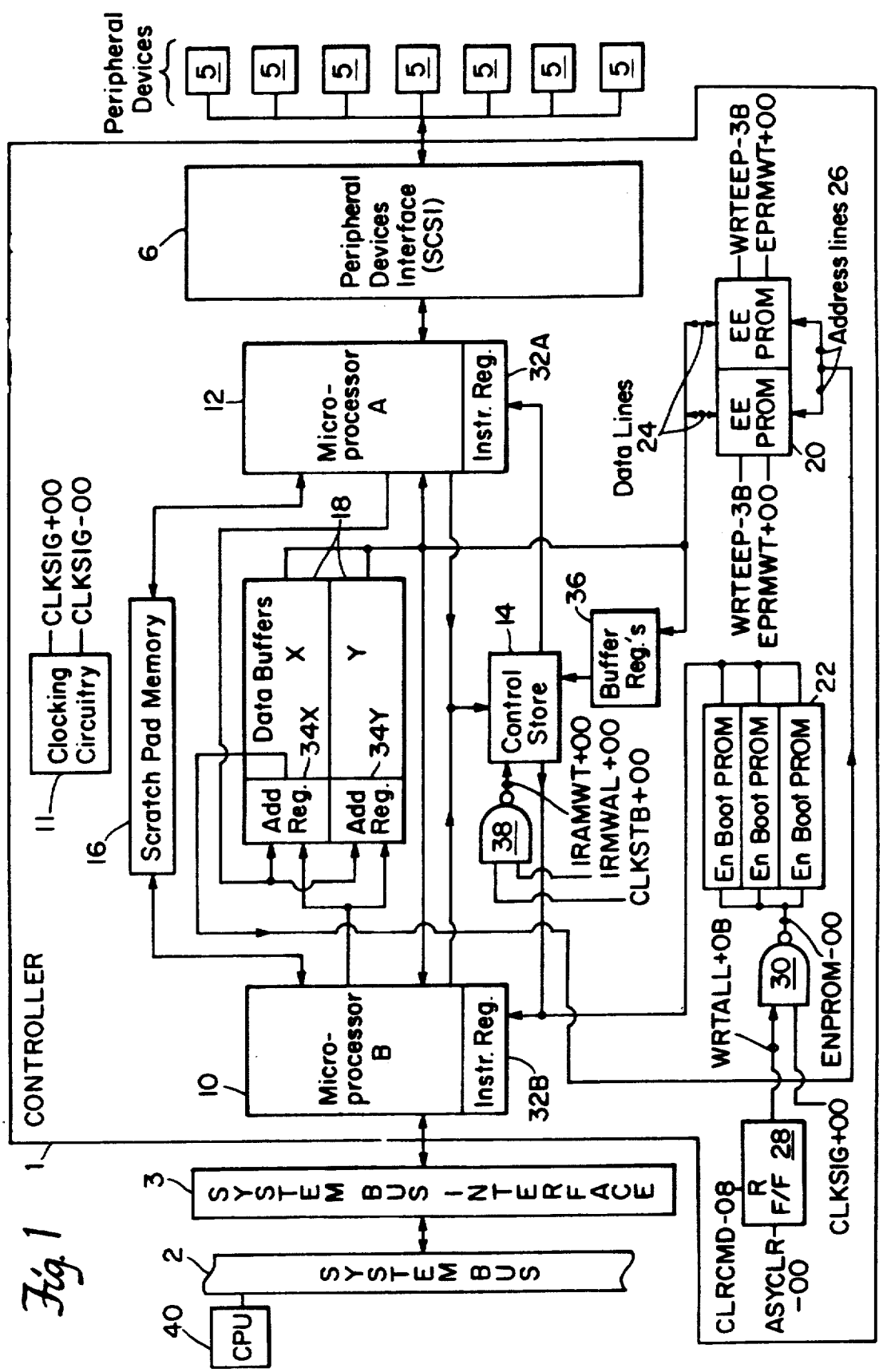
FIG. 1 shows the major elements of the controller.

In the preferred embodiment of the present invention, a peripheral device controller 1 controls data transfers between a data processing system bus 2 and peripheral devices 5 (FIG. 1). The controller 1 controls the data transfers with its two microprocessors 10 and 12. Microprocessor 10, denoted as microprocessor A, controls data transfers between the peripheral devices 5 and data buffers 18X and 18Y. Microprocessor 12, denoted as microprocessor B, controls data transfers between the system bus 2 and the data buffers 18X and 18Y.

Connected between and shared by these microprocessors 10 and 12 are the above-mentioned data buffers 18X and 18Y. The data buffers 18X and 18Y temporarily store data received from either the peripheral devices 5 or the data processing system connected by the system bus 2. Similarly connected between and shared by the microprocessors 10 and 12 are a scratch pad memory 16 and a control store 14. The scratch pad memory 16 is used for interprocessor communication, and the control store contains sets of microinstructions that control the operation of the microprocessors 10 and 12. The control store 14 contains a set of microinstructions for each microprocessor.

The controller 1, likewise, contains clocking circuitry 11 which synchronizes operation of the microprocessors 10 and 12. This synchronization is the central focus of the related application: Multiprocessor Controller Having Shared Control Store. In addition, the controller 1 has a peripheral devices interface 6 that meets the Small Computer System Interface Standard (SCSI). In the preferred embodiment, the interface is a Western Digital 3392 SCSI Controller Chip. This peripheral devices interface 6 is connected to a set of drivers and receivers which receive and transmit signals to and from the peripheral devices 5. Furthermore, there is a system bus interface 3 for interfacing the controller 1 with the system bus 2 of the data processing system.

The controller 1 further contains EEPROMs 20 for storing sets of microinstructions and peripheral configuration information. The microinstructions held in the EEPROMs 20 are for use in the control store 14. Boot PROMs 22 are provided for storing firmware that directs microprocessor B to transfer the sets of microinstructions held in the EEPROMs 20 to the control store 14. The details of this process will be discussed below.

Figure 2:
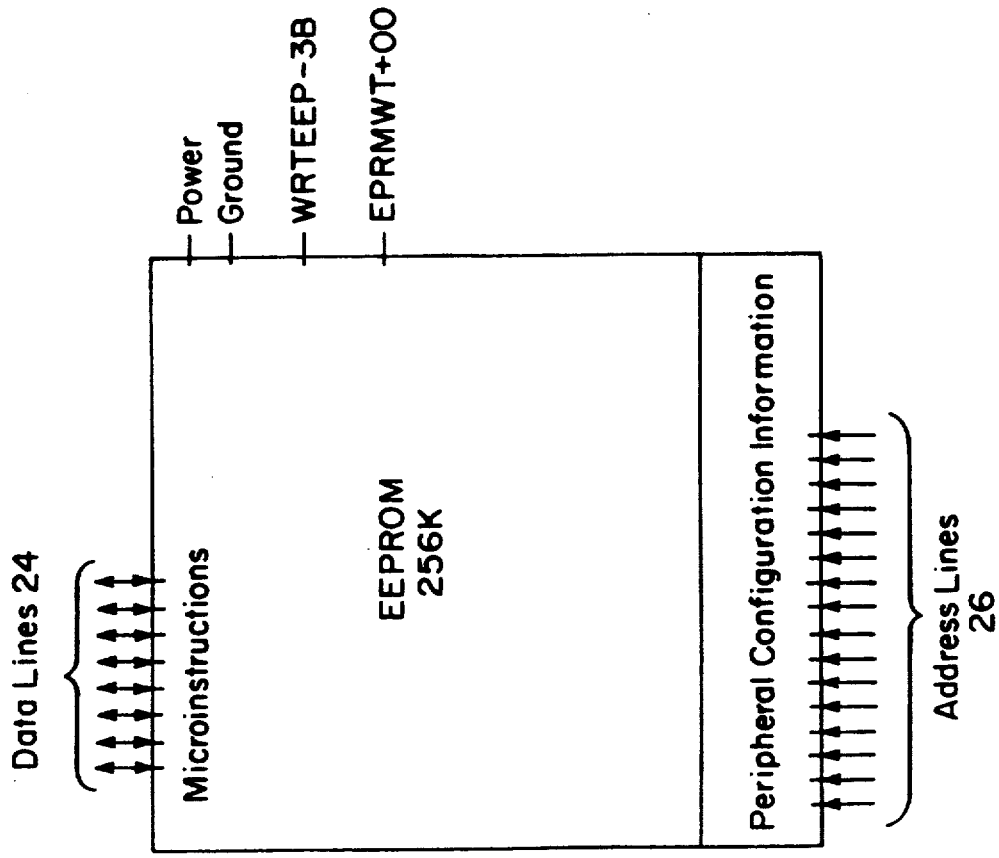
FIG. 2 shows one of the EEPROMs of FIG. 1 in more detail.

FIG. 2 shows a more detailed view of one of the EEPROMs 20. In the preferred embodiment, two 256K EEPROMs such as the Xicor 28C256 are used. The EEPROMs 20 have data lines 24 and address lines 26. These lines are used for reading from the EEPROMs 20 as well as writing to the EEPROMs 20. Whether they are used for writing or reading depends on the EPRWRT+00 input which is an output enable. When EPRWRT+00 is high, the output is enabled, and the data contained in the EEPROM at the address asserted on the address lines 26 is output to the data lines 24. On the other hand, when EPRWRT.00 is low, the output is not enabled, and the data contained on the data lines 24 is written into the EEPROM location addressed by the address on the address lines 26.

When installed in the controller 1, the EEPROMs 20 already contain a set of microinstructions. These microinstructions are externally electrically programmed prior to the EEPROMs, connection to the other controller components. Thus, when initially powered up, the EEPROMs 20 contain microinstructions. In subsequent powering up sequences, the EEPROMs 20 contain either this initial set of microinstructions or a set subsequently written into the EEPROMs 20 to replace the previous set of microinstructions. The process involved in encoding new sets of microinstructions into the EEPROM will be discussed in detail below.

The microinstructions are held in the EEPROMs 20 so that the microinstructions are not lost when the controller 1 is powered down. When powered down, however, the EEPROMs retain the microinstructions, even though they are lost from the control store 14. Thus, upon powering up, the microinstructions held in the EEPROMs 20 are transferred to the control store 14.

FIG. 3 shows the steps involved in transferring the sets of microinstructions from the EEPROMs 20 to the control store 14.

To minimize the cost of the EEPROM, one which only outputs 8 bits of data rather than the 24 bits required by microinstructions, has been chosen. To assist in the transfer of the microinstructions from the EEPROM to the control store, nonwritable boot PROMs 22 having a 32 bit output have been provided.

Upon powering up, the CPU 40 issues a master clear instruction to microprocessor B (See Step 42 in FIG. 3). This master clear instruction is used to generate an oscillating signal ASYCLR-00. The ASYCLR-00 signal enters a flip-flop 28 (See FIG. 1). The reset of this flip-flop 28 is CLRCMD-0B which is generated by the decoding circuitry of microprocessor B in response to the clear command. The output from this flip-flop 28 is WRTALL+0B. WRTALL+0B and CLKSIG+00, a clock signal generated by the clocking circuitry 11, enter a NAND gate 30. The output from this NAND gate is ENPR0M-00 which feeds into the output enable of the boot PROMs 22.

The contents of the boot PROMs 22 are read out (Step 44) sequentially in response to ENPROM-00. The contents of the boot PROMs 22 are fed into the instruction register 32B of microprocessor B. Since the output of each boot PROM 22 is only one third of the length of a microinstruction, three boot PROMs 22 are used in the preferred embodiment. The 24 bits of their three outputs simultaneously travel to the instruction register 32B where they are clocked in at the appropriate time.

Microprocessor B executes these microinstructions received from the boot PROMs 22. Hereinafter, these instructions will be referred to as the boot firmware. The boot firmware directs microprocessor B to seize (Step 46) data buffer 18X. It then clears the address register 34X for data buffer 18X to zero. The EPRMWT+00 signal is set high so that the contents of the EEPROMs can be read. After EPRMWT+00 is set, the address held in the address register 34X of the data buffer 18X is asserted on the address lines 26 to the EEPROM and the contents of the addressed location appear on the data lines 24 (See Step 48).

Since the address register 34X of data buffer 18X is cleared initially, the zero location in the EEPROMs 20 is the first location read. The address register 34X is a counter, thus, the boot firmware need only increment the counter to read the next EEPROMs location. In each of thee locations, there is a byte which is a part of a microinstruction.

The bytes read out of EEPROMs 20 are temporarily stored (Step 50) in buffer registers 36. One byte at a time is stored in the buffer registers 36 until a microinstruction is accumulated. The boot firmware then issues an instruction that produces a signal IRMWAL+00 to the control store which allows the microinstruction to be written into the control store. IRMWAL+00 and CLKSTB+00, another clock signal produced by the clocking circuitry 11, enter a NAND gate 38 to produce IRAMWT-00. IRAMWT-00 acts as a write pulse to the control store 14 When the buffer registers 36 become full, IRAMWT-00 writes (Step 52) the microinstruction they hold into the control store 14. After writing the microinstruction into the control store, the control store is incremented.

The above steps are repeated until all of the microinstructions are read out of the EEPROMs 20 and written into the control store 14. At that point, the boot PROMs 22 are disabled (Step 54), and normal controller operation can begin. It should be noted that although this transfer process occurs every time the controller 1 is powered up, the process may also be generated by a software command from the system CPU 40 at times other than when the controller 1 is powered up.

Figure 4:
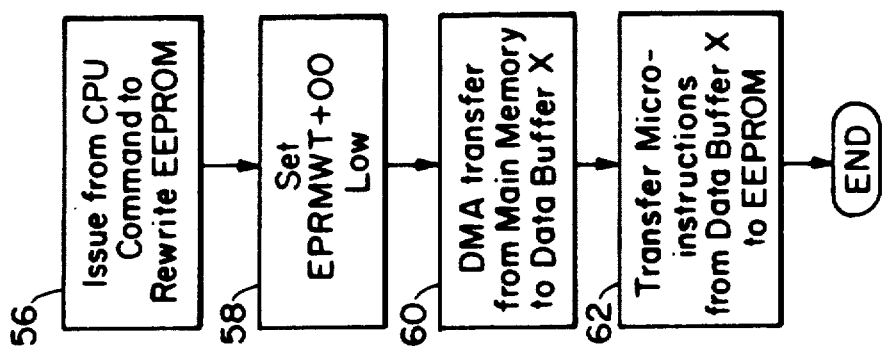
FIG. 4 shows a flow chart depicting the process of reloading the EEPROM from main memory.

It is often desirable to be able to change the set of microinstructions held in the EEPROMs 20. The present invention allows for such changes by utilizing the desirable erasability feature of the EEPROMs 20. They can be reencoded without being physically removed from the controller. As shown in FIG. 4, to reload the control store 14 the CPU 40 issues a command (Step 56) to microprocessor B to rewrite the EEPROMs 20.

The rewrite command from the CPU starts the execution of a routine of microinstructions held in the control store 14. The microinstructions direct microprocessor B to change EPRMWT.00 to low 58) so that data can be written into the EEPROMs 20. The routine then directs microprocessor B to the main memory location where the new microinstructions are held, and microprocessor B performs a Direct Memory Access (DMA)

transfer (Step 60) of the entire sets of microinstructions into data buffer 18X. Each data buffer location contains a byte. Details of writing into and reading from the data buffer 18X are discussed in the related application Peripheral Controller with Paged Data Buffer Management.

Once all the new microinstructions are transferred into data buffer 18X, the routine directs microprocessor B to read these instructions out of the data buffer 18X and write them (Step 62) to the EEPROMs 20. After the microinstructions are read out of the data buffer 18X, the routine directs microprocessor B to utilize the write pulse signal WRTEEP-3B to write the microinstructions into the EEPROMs. The addresses in the EEPROMs 20 where the microinstructions are stored correspond to the addresses in the data buffer 18X where the microinstructions are stored. The correspondence in addresses is attributable to the use of the addresses in the address register 34X as the inputs into the address lines 26 of the EEPROMS 20. When all the microinstructions have been transferred from the data buffer 18X to the EEPROMs 20, EPRMWT.00 is switched back to low so that the EEPROMs can no longer have data written therein. At any time thereafter, the new microinstructions may be transferred from the EEPROMs 20 to the control store with a clear command which leads to the boot operation described above.

Another means of reloading the EEPROMs 20 is for the CPU 40 to issue an instruction to change the EEPROMs 20, as discussed above, but for the new microinstructions or configuration information to be read from a peripheral device 5 such as a disk drive rather than main memory. The new contents are read into the data buffer 18X and then passed on to the EEPROMs 20.

There are no strict time limitations as to when the CPU 40 may request to reload the EEPROMs 20. The decision as to when to reload is within the CPU's discretion. Moreover, the reloaded microinstructions in the EEPROMs 20 need not be immediately transferred to the control store 14. The reloaded microinstructions, however, are transferred in the next powering up sequence.

As mentioned in initially describing the EEPROMs 20, they store peripheral configuration information as well as microinstructions. Storing such peripheral configuration information in the EEPROMs 20 prevents the controller 1 from having to poll the peripherals every time it is powered up. This is particularly important with peripheral devices that are not usually powered up themselves as they would not be able to respond to the polling. Moreover, since the configuration information is stored in the EEPROMs 20, it can be readily updated.

FIG. 6 shows the steps involved in obtaining peripheral configuration information. This process begins with the CPU 40 issuing a reconfigure command (Step 64) to microprocessor B via the system bus 2. The CPU 40 may issue this command at its discretion but will usually do so during an initial system set-up procedure, when the user assumes that all peripherals are powered up. Microprocessor B views this command and places it in scratch pad memory 16 for microprocessor A to retrieve (Step 66). Microprocessor A subsequently retrieves (Step 68) the command from scratch pad memory 16 and begins to execute it. The command is designed to be executed only when all attached peripheral devices 5 are powered up so that all attached peripheral devices 5 can be queried.

In order to execute the command, microprocessor A polls each of the peripheral devices 5 to obtain the peripheral configuration information (Step 70). In particular, it asks each peripheral device 5 for a peripheral device identifier and for other information concerning the peripheral device's operating characteristics. Once this information is obtained from the peripheral devices, it is written into data buffer 18X. When all the peripheral configuration information is written into data buffer 18X, microprocessor B reads this configuration information out of the data buffer 18X and writes it (Step 72) into in the EEPROMs 20. The steps in writing from the data buffer 18X into the EEPROMs 20 are the same as those previously described in the description of reloading new sets of microinstructions, except that different addresses are used, and configuration information rather than microinstructions are involved.

Figure 5:
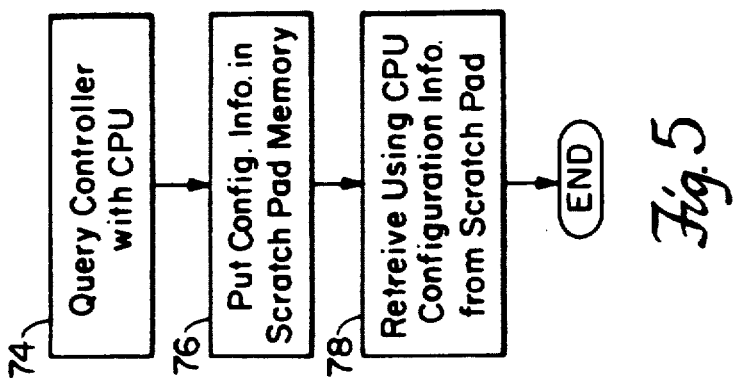
FIG. 5 shows a flow chart depicting the data processing system initialization process.

The peripheral configuration information is used, for example, when the data processing system is powered up. The CPU 40 of the data processing system executes a software routine when it is powered up. This routine queries (Step 74 in FIG. 5) all the devices connected to the data processing system to determine what they are. When the controller is queried, microprocessor B passes (Step 76) the configuration information into scratch pad memory 16. The configuration information for each peripheral device 5 is stored at a predetermined address associated with that type peripheral device. The CPU 40 checks (Step 78) the predetermined locations in scratch pad memory 16 and, thus, obtains the desired information.

Passing peripheral configuration information to the CPU 40 in this manner allows the CPU 40 to obtain an accurate query. If the configuration information were not stored in the EEPROMs 20, it would be necessary for all the peripherals to be powered up when the CPU 40 queried the controller. Such a design could be problematic since some peripherals are not normally powered up at the same time as the CPU 40. The present invention overcomes this problem and in addition, allows peripheral configuration information to be readily changed without requiring the peripheral devices 5 to be polled every time the controller is powered up.

The hardware used in the preferred embodiment seeks to balance several concerns. A PROM provides a nonvolatile store of microinstructions, but the contents of the PROM cannot be updated. To change the PROM's contents, the old chips must be replaced with new differently programmed chips. If an EPROM is used instead, the contents can be changed, but a change requires removal of the chip. Moreover, EPROMS have slow memory access times. The use of only an EEPROM suffers this same difficulty of slow memory access time. By using both an EEPROM and a RAM, the present invention overcomes these hurdles and enjoys the benefits of nonvolatility and speed.

Furthermore, an EEPROM 20 has been employed to allow the control store 14 to be readily changed while providing permanence, if desired, of microinstructions. The use of an EPROM or other boot PROM not reprogrammable within the system to carry boot instructions allows for the benefit of the EEPROM at minimal expense.

While the invention has been particularly shown and described with reference to a preferred embodiment thereof, it will be understood by those skilled in the art that various changes in form and details may be made therein without departing from the spirit and scope of the invention as defined in the appended claims.

We claim:

1. A method, in a system comprising a Central Processing Unit having a memory for storing data including microinstructions for control of a peripheral device controller, a peripheral device controller coupled to said Central processing Unit and a plurality of peripheral devices coupled to said controller, the peripheral device controller having at least one microprocessor for directing the operations of said controller and a control store coupled to said at least one microprocessor for storing microinstructions for the at least one microprocessor, comprising the steps of:
   a storing a plurality of microinstructions, for execution by the at least one microprocessor, in an EEPROM coupled to said control store;
   b unloading the plurality of microinstructions, from the EEPROM into the control store;
   c instructing the at least one microprocessor in the peripheral device controller to reload a new plurality of microinstructions into the EEPROM;
   d using the at least one microprocessor operating on microinstructions from the control store to transfer the new plurality of microinstructions from the memory of the Central Processing Unit into the EEPROM; and
   e unloading the new plurality of microinstructions from the EEPROM into the control store.

2. A method as recited in claim 1 further comprising the steps of transferring the new plurality of microinstructions to a data buffer before transferring them into the EEPROM.

3. A method as recited in claim 1 wherein the memory further comprises a system main memory.

4. A method as recited in claim 1 further comprising the step of interrogating peripheral devices by the processor in order to surmise configuration information and loading that configuration information into the EEPROM using the at least one microprocessor.

5. A method as recited in claim 1 wherein the new plurality of microinstructions are unloaded from the EEPROM into the control store using a boot PROM.

6. A method of managing peripheral configuration information in a data processing system having a Central Processing Unit and a peripheral device controller which controls the data transfer operations between a plurality of peripheral devices and said CPU comprising the steps of:
   a) using a microprocessor in the peripheral device controller to query peripheral devices to obtain peripheral configuration information;
   b) storing the configuration information in a data buffer coupled to said microprocessor;
   c) using said microprocessor in the peripheral device controller, transferring the configuration information from the data buffer into an EEPROM, coupled to said microprocessor, as a table;
   d) upon subsequent powering up of the data processing system, using the CPU to query the peripheral device controller; and
   e) passing the configuration information held as a table in the EEPROM to the CPU in response to the CPU query.

7. A peripheral device controller for controlling data transfers between a data processing system bus of a central processing unit, having a memory for storing data including microinstructions for control of the peripheral device controller, and a plurality of peripheral devices comprising:
   a a processor for executing microinstructions which controls data transfer between the peripheral device controller and said plurality of peripheral devices;
   b a control store, coupled to said processor, comprising a random access memory for storing microinstructions that are executed by the processor;
   c an electrically erasable programmable read only memory (EEPROM), coupled to said control store and said processor, for storing as contents microinstructions for execution by the processor;
   d means for loading the contents of the EEPROM into the control store for subsequent execution by the processor;
   e means for instructing the processor to update the contents of the EEPROM by instructing the processor to reload a new plurality of instructions into the EEPROM and, using the processor, operating on microinstructions from the control store, transferring the new plurality of microinstructions from the central processing unit into the EEPROM, and unloading the new plurality of microinstructions from the EEPROM into the control store.

8. A peripheral device controller as recited in claim 7 wherein the processor in the controller interrogates said plurality of peripheral devices to obtain information on a configuration of said plurality of peripheral devices and said configuration information is stored in the EEPROM.

9. A peripheral device controller as recited in claim 1 further comprising a boot PROM, coupled to said processor, for storing boot microinstructions to enable the microinstructions stored in the EEPROM to be read into the control store.

10. A peripheral device controller as recited in claim 7 wherein the processor further comprises a plurality of microprocessors.

11. A peripheral device controller for controlling data transfer between a data processing system bus of a Central Processing Unit (CPU) and a plurality of peripheral devices comprising
   a at least one microprocessor for executing microinstructions to control data transfers between the controller and said plurality of peripheral devices and to interrogate the peripheral devices to obtain information of a configuration of said peripheral devices;
   b a buffer for storing the configuration information from the peripheral devices;
   c a control store, coupled to said microprocessor, comprising a random access memory for storing the microinstructions that are executed by the at least one microprocessor;
   d an EEPROM, coupled to said control store and said microprocessor, for storing the microinstructions and peripheral configuration information of said plurality of peripheral devices, the peripheral configuration information being transferred to the EEPROM from the data buffer by the microprocessor;
   e means coupled to said microprocessor, for storing boot microinstructions which when executed unload the microinstructions of the EEPROM into the control store for use by the at least one microprocessor;
   f means for updating the EEPROM by instructing the at least one microprocessor to reload the EEPROM; and
   g means for responding to a query from the CPU to pass the peripheral configuration information to the CPU.

* * * * *